June 11, 1940.　　　　L. GOLDHAMMER　　　　2,204,488

PHOTOGRAPHIC CAMERA

Filed Oct. 9, 1937

Leo Goldhammer
Inventor

By　Attorney

Patented June 11, 1940

2,204,488

UNITED STATES PATENT OFFICE 2,204,488

PHOTOGRAPHIC CAMERA

Leo Goldhammer, Munich, Germany, assignor, by mesne assignments, to General Aniline & Film Corporation, New York, N. Y., a corporation of Delaware Application October 9, 1937, Serial No. 168,185
In Germany October 13, 1936

3 Claims. (Cl. 95—53)

The present invention relates to an improvement in photographic cameras of the kind in which the shutter is released by means of a combination of gear rods or the like extending from the camera casing; the release motion has been transmitted by connecting rods pivoted scissorwise, rotatable shafts, double-armed levers or the like.

One of the objects of the present invention is to provide in a camera of this kind a shutter releasing mechanism of simple construction which can be manufactured cheaply. Further objects will appear from the following specification. In this shutter releasing mechanism, the release motion is transmitted to the shutter by means of a single connecting rod directly connected on the one hand with the release rod or the like carried by the camera casing and on the other hand with the shutter releasing member on the objective carrier. The connecting rod may be connected with the shutter releasing member by a slide mounted on the objective carrier and engaging the shutter releasing member.

The mechanism of the present invention is specially suited for use in a bellows or tube camera whose objective has a small range of movement, that is, for miniature picture cameras.

A mechanism constructed in accordance with the invention is illustrated in the accompanying drawing, showing a roll film camera viewed from the front (Fig. 1), from above (Fig. 2) and from one side (Fig. 3) respectively.

Figure 1:
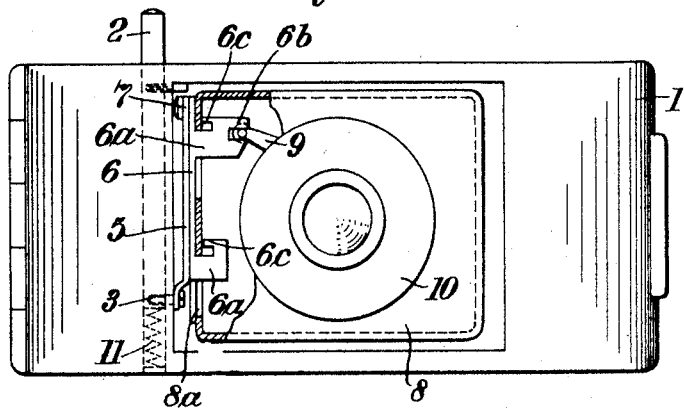
Figure 2:
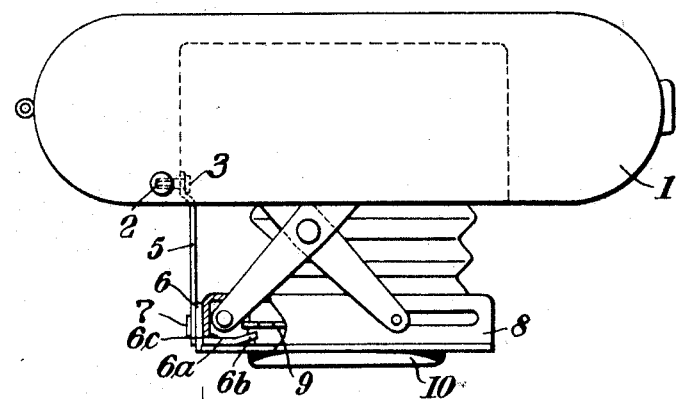
Figure 3:
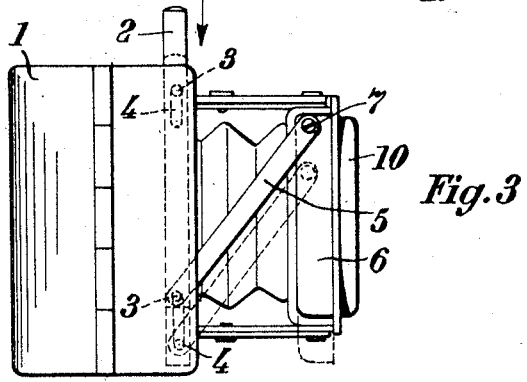

The release rod 2 is mounted to slide in the camera casing 1 by means of a connection by pin and slot 3, 4. To the lower end of the releasing rod 2 a connection rod 5 is pivotally attached by means of a screw or a pin 3, the other end of the connecting rod 5 being pivoted at 7 on a member 6 having guide flanges 6a and adapted to slide on the objective carrier 8. The upper flange 6a has a slot 6b which engages the release lever 9 of the shutter 10, the member 6 thus serving to connect the rod 5 with the release lever 9. The slide 6 is mounted on the objective carrier, as is best seen in Figs. 1 and 2, by means of the flanges 6a which engage in slots 8a in the objective carrier and are prevented from disengagement by bent portions 6c. After releasing the shutter the release pin 2 is automatically returned to its original position by a spring 11. Fig. 3 shows in full lines the normal positions of the parts and in broken lines their positions during release of the shutter.

What I claim is:

1. In a photographic camera including a casing and an objective carrier movable toward and away from said casing, a shutter release member on said carrier, a shutter releasing rod slidably mounted in said casing, a slide on said carrier having engagement with said shutter release member and movable in a direction substantially parallel to the direction of movement of said releasing rod, and a connecting rod pivotally engaging said releasing rod and said slide for operative connection therebetween.

2. In a photographic camera including a casing and an objective carrier movable toward and away from said casing, a shutter release member on said carrier, a shutter releasing rod slidably mounted for reciprocation in said casing, a slide on said carrier having a slot engaging with said shutter release member and movable in a direction substantially parallel to the direction of movement of said releasing rod, and a connecting rod piovtally engaging said releasing rod and said slide for operative connection therebetween.

3. In a photographic camera having a casing, an objective carrier movable with respect thereto, and a shutter release member on said carrier the combination comprising a shutter release rod slidably mounted on said casing, a releasing slide mounted on said carrier and engaging said shutter release member, said slide being movable in a direction substantially parallel to the direction of movement of said release rod, and a single connecting rod operatively engaging said release rod and said releasing slide, said connecting rod being pivotally connected to said release rod and slide whereby operation of sail release rod actuates said slide and said shutter release member, and movement of said carrier toward said casing is permitted without disengagement of any of said parts.

LEO GOLDHAMMER.